United States Patent [19]

Cielker

[11] Patent Number: 5,597,266

[45] Date of Patent: Jan. 28, 1997

[54] CABLE-LAYERS

[76] Inventor: Werner Cielker, Haus Papillon, D-54587 Birgel, Germany

[21] Appl. No.: 401,797

[22] Filed: Mar. 10, 1995

[30] Foreign Application Priority Data

Mar. 10, 1994 [EP] European Pat. Off. ............ 94103649

[51] Int. Cl.$^6$ ............................. F16L 1/032; H02G 1/06
[52] U.S. Cl. ........................... 405/154; 248/49; 248/55
[58] Field of Search ............................. 405/154, 155, 405/156, 157; 248/49, 55, 83

[56] References Cited

FOREIGN PATENT DOCUMENTS

| 2700598 | 7/1994 | France | 405/154 |
| 2705426 | 11/1994 | France | 405/154 |
| 160302 | 6/1989 | Japan | 405/154 |
| 49513 | 3/1991 | Japan | 405/154 |

Primary Examiner—David J. Bagnell
Attorney, Agent, or Firm—Diller, Ramik & Wight, PC

[57] ABSTRACT

A cable-laying apparatus (1, 1') is provided which includes a frame (9) defined by trusses (10, 11, 12, 46, 46') which are relatively foldable between operative and inoperative positions. The frame carries conveyor rollers (13, 14, 15) arranged to define a generally isosceles-shaped area therebetween through which a cable passes. A lowermost of the conveyor rollers (13) is connected by a quick connect/disconnect mechanism (33) to the frame and normally occupies a slightly inclined position transverse to an associated cable ditch. When the quick connect-disconnect mechanism (33) is operated, the transverse conveyor roller (13) drops or pivots to a vertical position under the influence of gravity which in turn drops the cable to the bottom of an associated ditch.

16 Claims, 9 Drawing Sheets

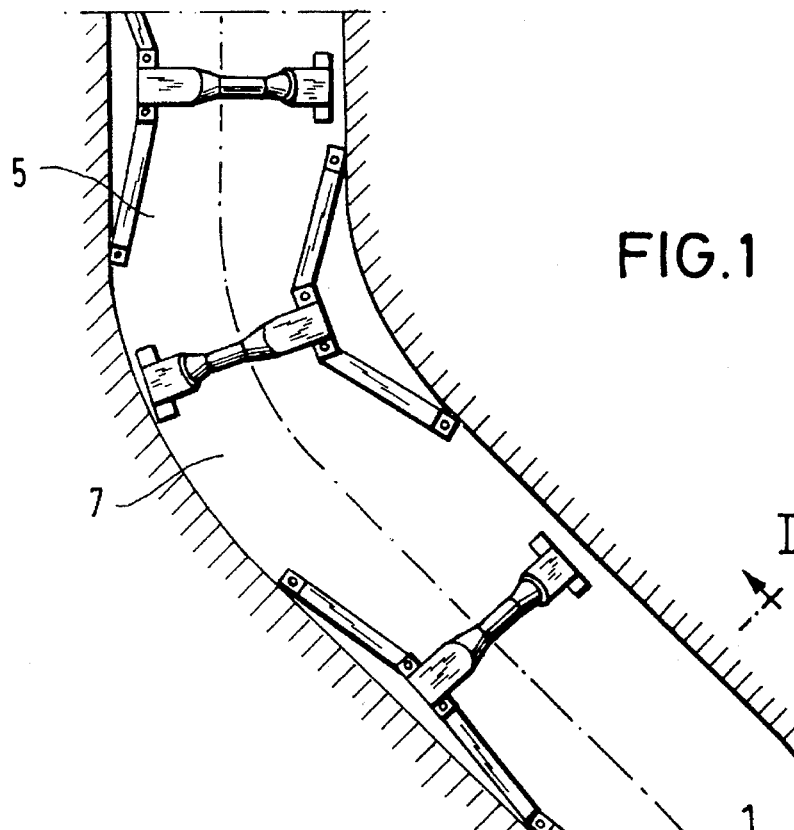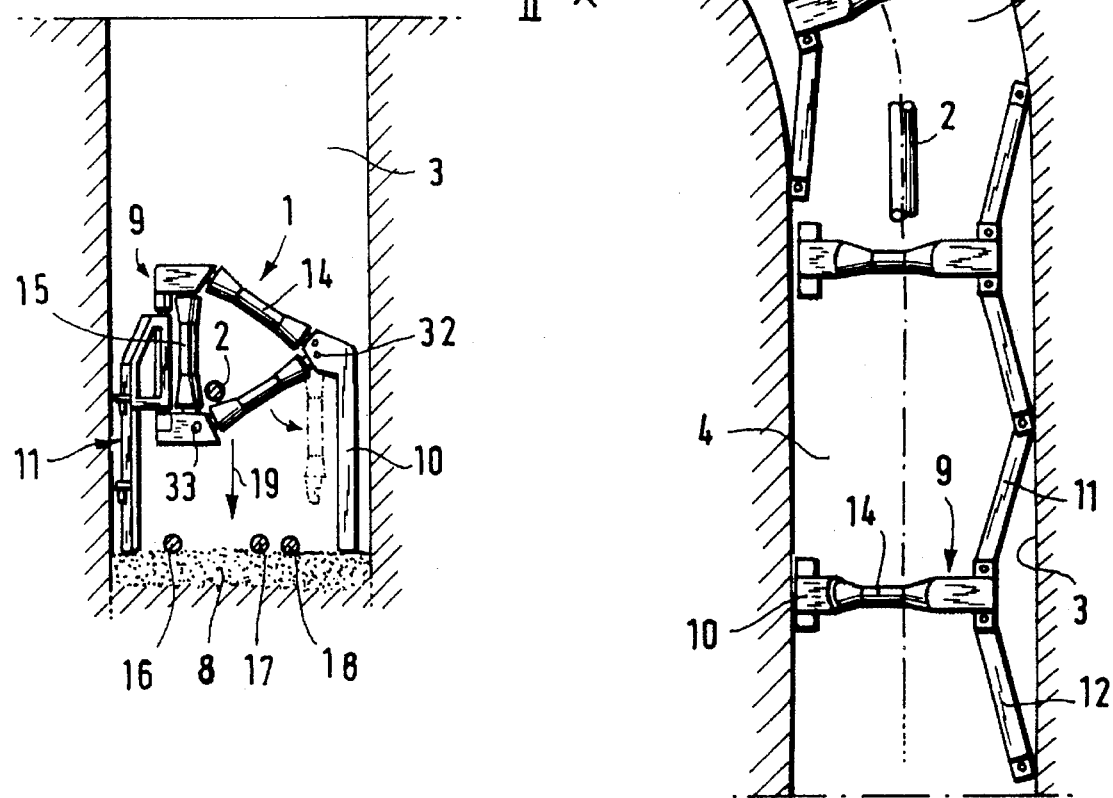

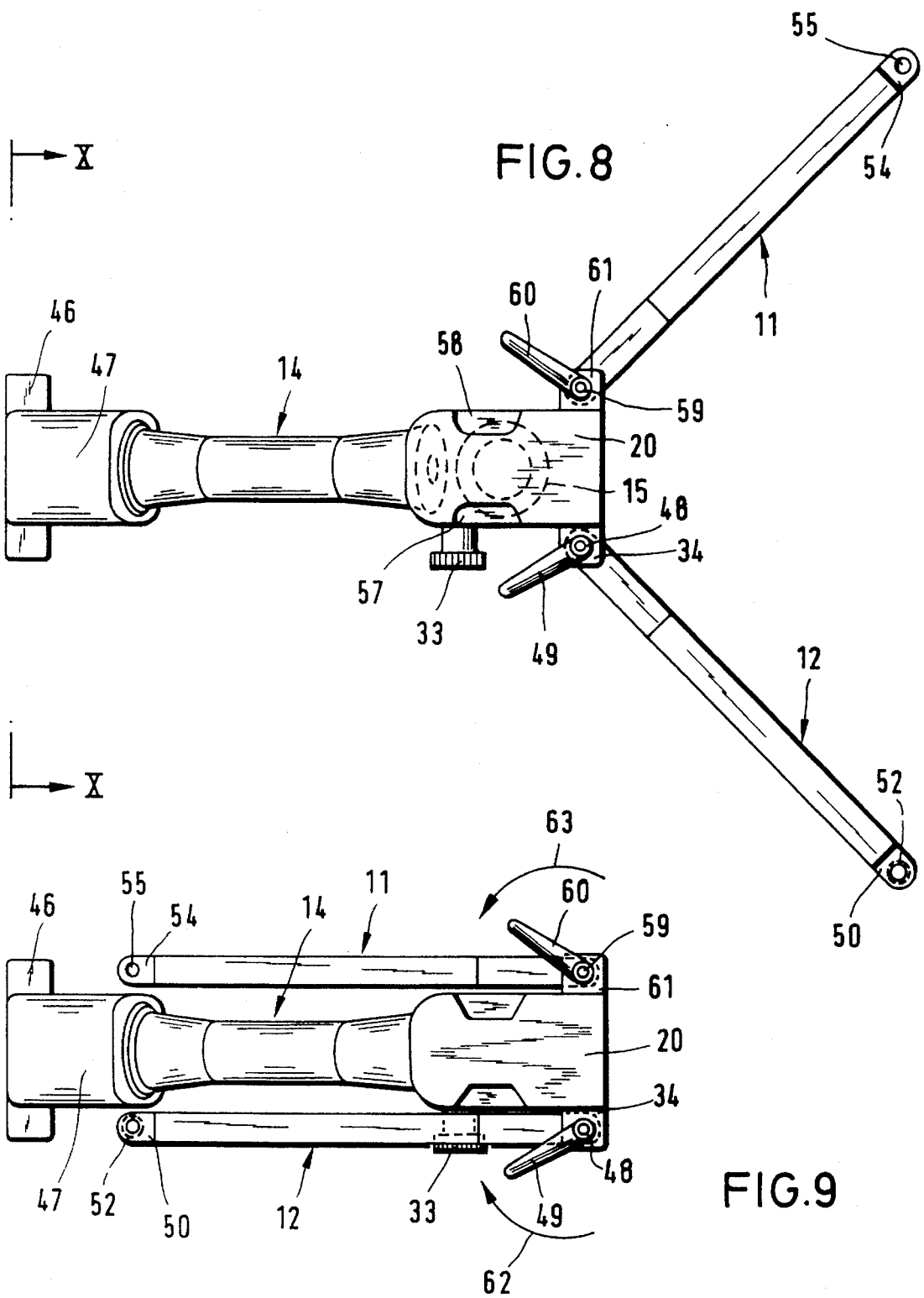

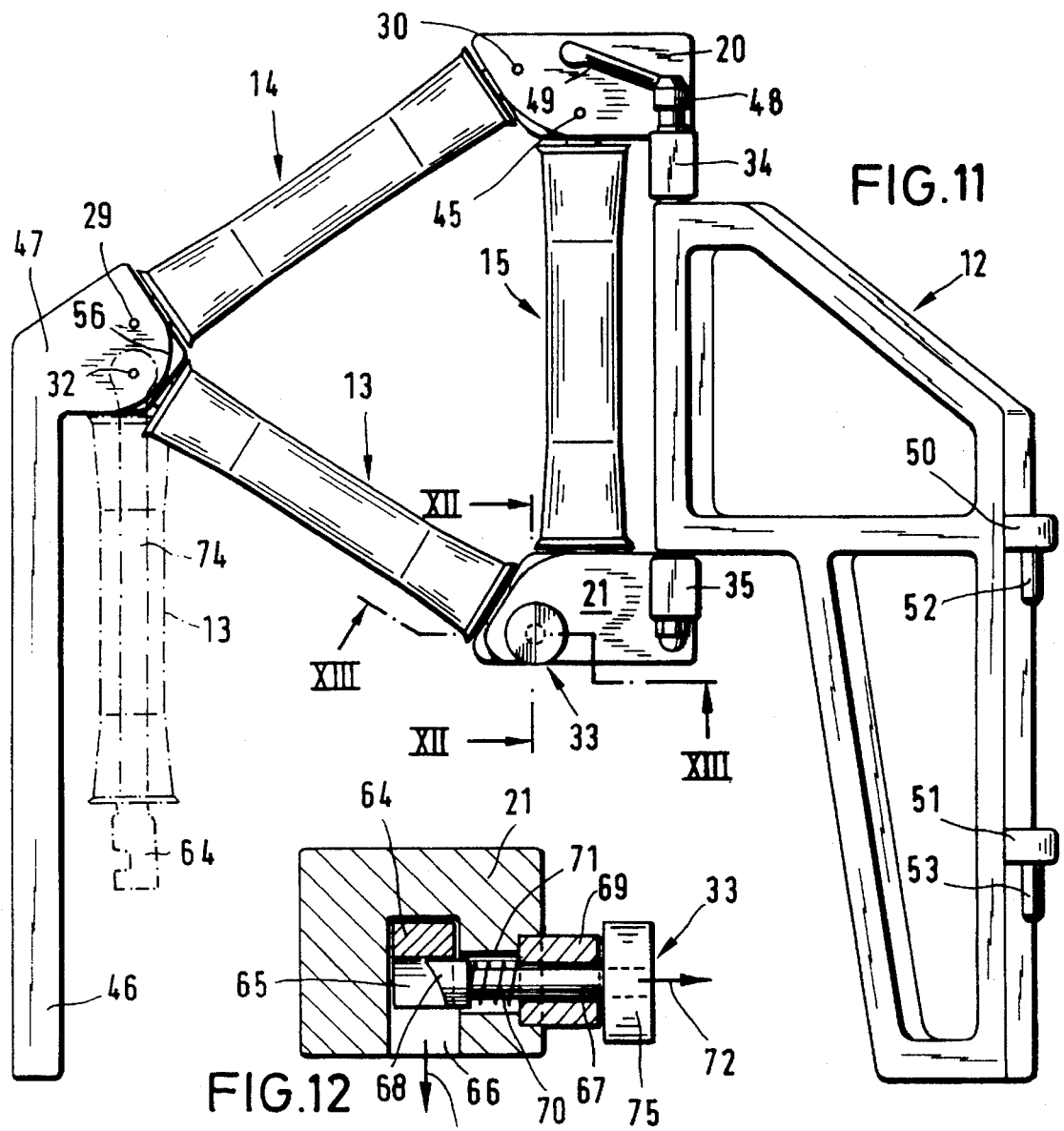
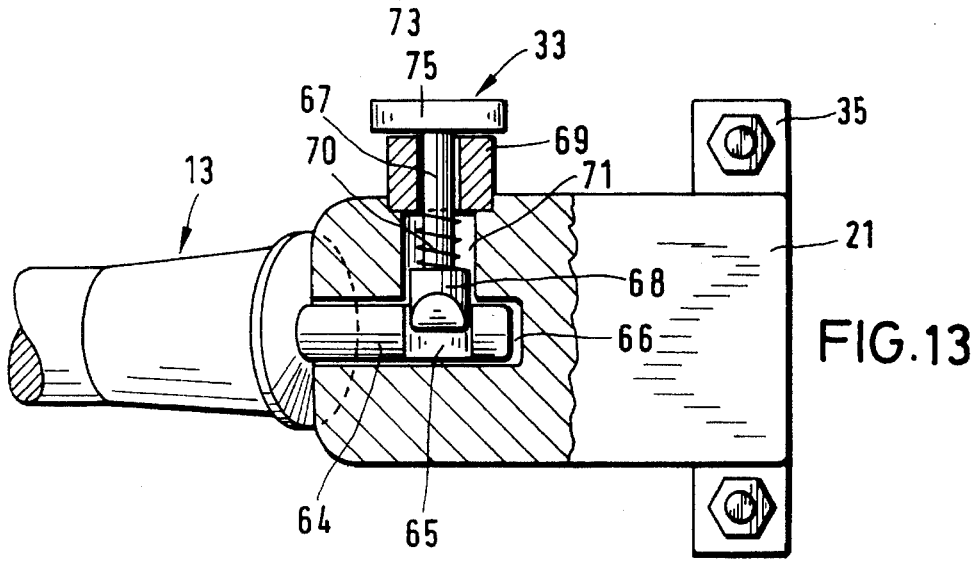
FIG.11
FIG.12
FIG.13

5,597,266

CABLE-LAYERS

BACKGROUND OF THE INVENTION

This invention is related to apparatus for laying cables into upwardly opening ditches, and specifically relates to so-called cable-layers which include a frame and at least one rotatably supported roller. Such cable-layers are positioned appropriately in a ditch and a cable which is to be buried in the ditch is supported upon and can be relatively moved (pulled) along the frames due to the rotatable rollers thereof which assists in the cable burying operation.

Conventional cable-layers include a frame which is supported upon a bottom of an associated ditch which is to receive a cable or cables. The frame carries a stationary axle which rotatably journals a conveyor roller disposed generally transverse to the ditch. A large number of such conventional cable-layers are set-up in the ditch with a spacing between the cable layers essentially depending upon the path of the ditch, the length of the ditch and the thickness and/or rigidity of the cable being laid. The cable is lowered from above upon the transversely supported conveyor rollers and is initially pulled along the length of the ditch to thereby place the cable upon all of the transversely supported conveyor rollers. Thereafter, each cable-layer is tipped over bodily toward one side of the ditch so that the cable can then slip off each conveyor roller and in this fashion the cable is deposited upon the bottom of the cable ditch. Keeping in mind the fact that cable ditches and the cables laid therein extend from several meters up to two kilometers in length, the tipping of the many cable-layers entails substantial labor, particularly because several cables must be laid sequentially into a cable ditch. Therefore, not only must each cable-layer be bodily tipped over but it must be subsequently set-up once again to accommodate the next cable which is to be laid. Additionally, there is the danger of the cable slipping off the transverse conveyor roller when the cable is being pulled thereon incident to the performance of a burying operation. If the cable drops from one or more of the cable-layers and a portion of the cable falls into the ditch, the latter creates "drag" and precludes the cable from being laid efficiently, quickly and properly.

SUMMARY OF THE INVENTION

Accordingly, it is an object of the present invention to provide an easily manipulated apparatus or machine for facilitating the laying of a cable or cables into a ditch. In accordance with the present invention, a rotatable conveyor roller is held by one of its ends to an associated portion of a frame and another end of the conveyor roller is linked by a quick-connect/disconnect fitting to another portion of the frame. This conveyor roller is preferably retained or maintained transverse to the cable ditch and generally horizontally so that a cable can be readily supported by and moved upon a plurality of such conveyor rollers. However, when the quick-connect/disconnect fitting is operated to disconnect the conveyor roller associated with each frame, each conveyor roller drops by gravity to a generally vertical position and along with the same the cable drops by gravity into the ditch.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a top plan view of a plurality of cable-layers each constructed in accordance with this invention and illustrates the cable-layers positioned in a ditch having straight and curved portions with a roller of each cable-layer being disposed generally transverse to the ditch.

FIG. 2 is a vertical sectional view taken generally along line II—II of FIG. 1, and illustrates one of the plurality of cable-layers and a cable supported upon one of three conveyor rollers thereof.

FIG. 8 is a top view of the cable-layer of FIG. 7 in its operational position, and illustrates the legs or trusses thereof spread in a tripod-like orientation.

FIG. 9 is a top view of the cable-layer of FIG. 8, but illustrates the same in its collapsed condition for purposes of movement or storage.

FIG. 11 is a side view of the invention relating particularly to FIG. 7, and illustrates an axle carrying the lowermost transverse conveyor roller for detachably securing the same to the frame for movement between the solid and phantom outline positions thereof.

FIG. 12 is an enlarged cross-sectional view taken generally along line XII—XII of FIG. 11, and illustrates a quick-connect/disconnect mechanism or fitting for achieving the movement of the lower conveyor roller between the solid and phantom outline positions shown in FIG. 11.

FIG. 13 is a fragmentary cross-sectional view taken generally along the line XIII—XIII of FIG. 11, and illustrates further details of the quick-connect/disconnect mechanism.

DESCRIPTION OF THE PREFERRED EMBODIMENTS

Figure 3:
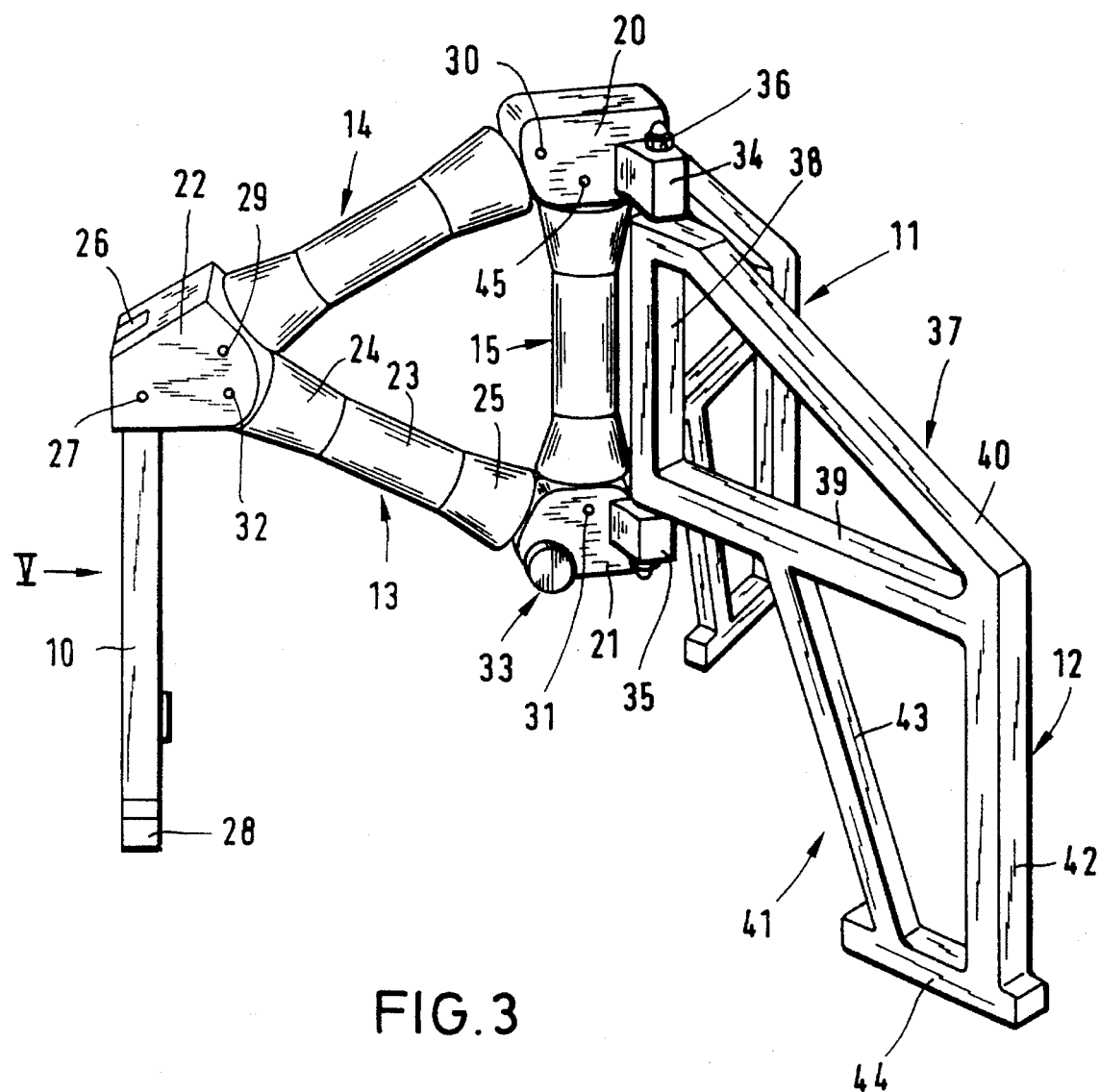
FIG. 3 is a perspective view of a cable-layer of the present invention, and illustrates its first operable position in which three frames or legs are angularly related to provide a tripod-like supporting base for the cable-layer which in the cable ditch supports a cable within three associated conveyor rollers arranged in an isosceles triangle orientation relative to each other.
Figure 4:
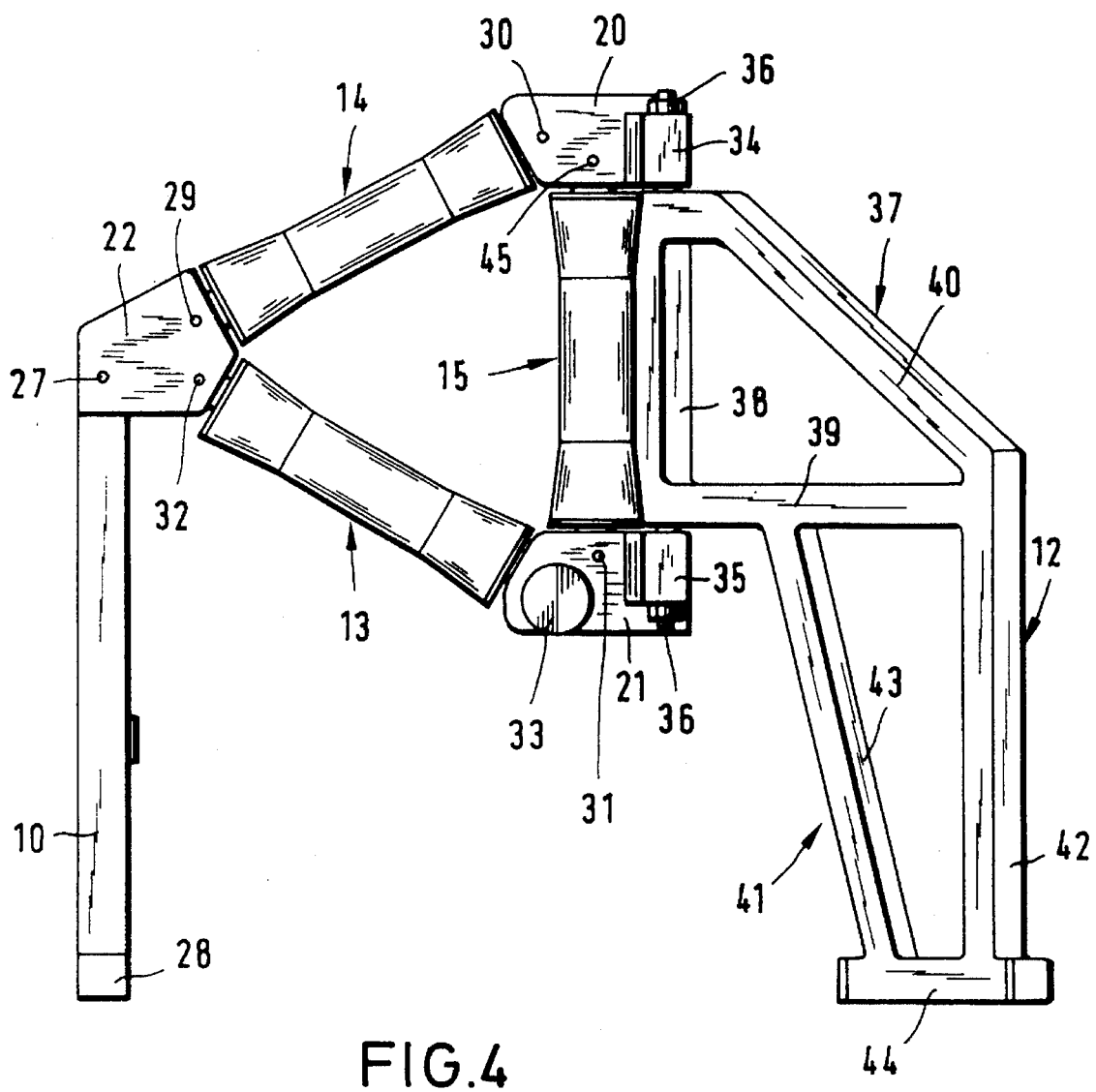
FIG. 4 is a side view of the cable-layer of FIG. 3, and illustrates further details thereof.
Figure 5:
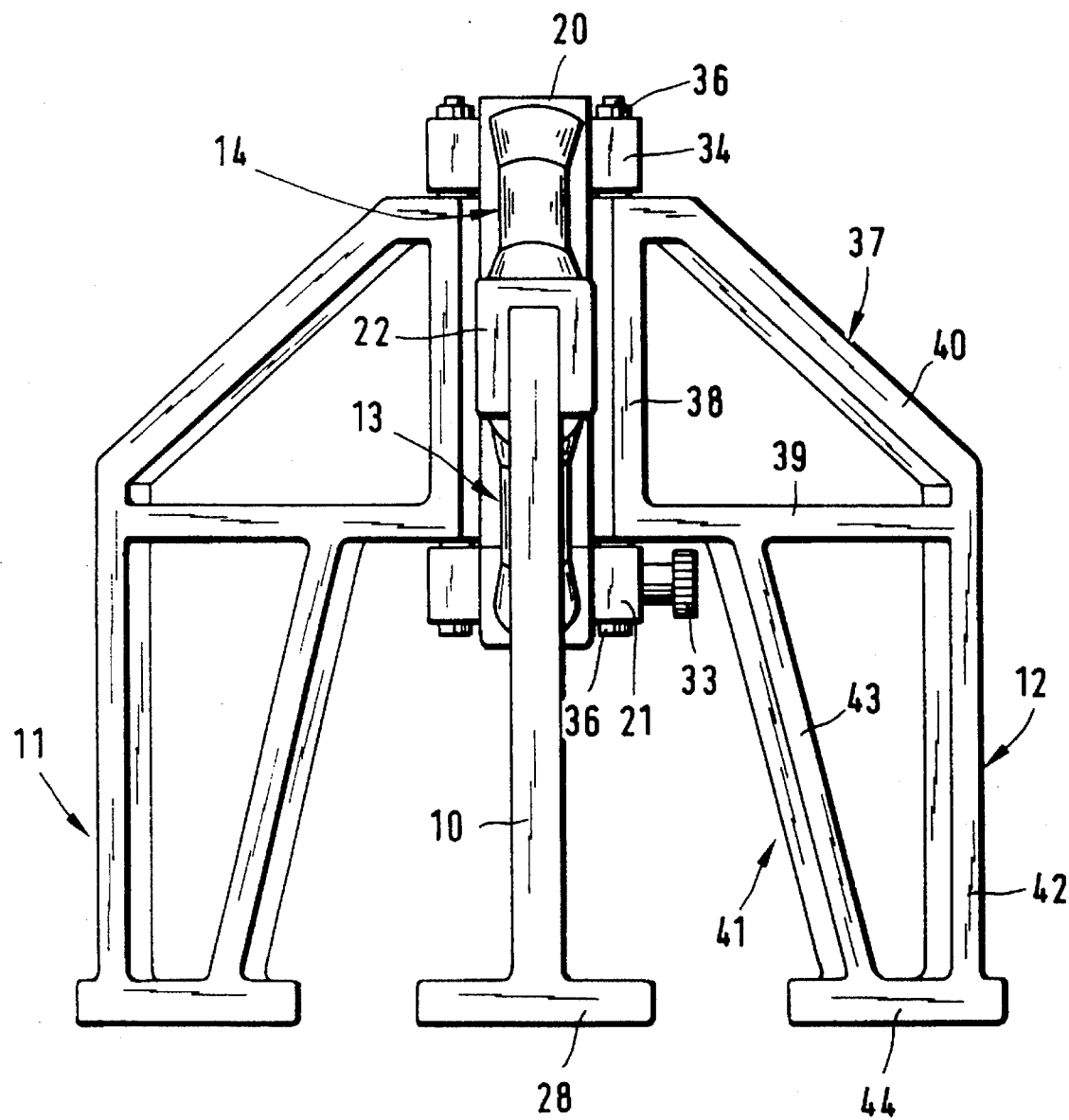
FIG. 5 is a front view of the cable-layer taken in the direction of the arrow V of FIG. 3, and illustrates the orientation of three legs or trusses of the cable-layer frame.

Reference is first made to FIGS. 1 and 2 of the drawings which illustrates a plurality of cable-layers which are associated with a cable 2 which is to be laid or deposited in a cable ditch 3 by utilizing a plurality of the cable-layers 1. The cable-layers 1 are spaced from each other suitable distances to achieve ease of laying the cable 2 upon and pulling the cable 2 relative to each of the cable-layers 1 incident to a cable-laying operation culminating in depositing the cable 2 upon a bottom (unnumbered) of the ditch 3.

The cable ditch 3 comprises straight ditch portions 4, 5 and arcuate or curved ditch portions 6, 7. The cable-layers 1 are orientated relative to these ditch portions to accommodate the most efficient support and orientation of the cable 2 incident to the cable-laying operation. Conventional cable-support material 8, such as a sand bed of approximately 10–20 cm thickness is placed upon the bottom (unnumbered) of the ditch 3 prior to placing the cable-layers 1 therein and performing the cable-laying operation. As is shown in FIG. 2, several previously laid cables 16, 17 and 18 are illustrated supported upon the sand bed material or base 8 of the ditch 3, and these may be appropriately identified by warning routing-bands associated therewith. Several such cables 16–18 may be laid next to each other in the ditch 3 or can also be laid in superposed relationship.

As is best illustrated in FIG. 2, a lower conveyor roller 13 disposed generally transverse of the ditch 3 and slightly inclined or horizontal thereto is connected at its right-hand end (unnumbered) to a frame 9 by a pivot pin 32. A left end (unnumbered) of the conveyor roller 13 is linked by a quick-connect/disconnect mechanism or fitting 33 to the frame 9 in such a manner that after disconnecting the quick-connect/disconnect mechanism 33 the conveyor roller 13 will drop from the solid outline position to the phantom outline position shown in FIGS. 2 and 11 to cause the cable 2 to drop by gravity in the direction of the arrow 19 of FIG. 2 upon the sand bed 8 of the ditch 3. The specific construction of the quick-connect/disconnect mechanism 33 will be described hereinafter, but the significance thereof is simply that every time following the opening of the quick-connect/disconnect mechanism 33, the cable 2 can drop unhampered from the conveyor roller 13 without the need to bodily move or tip the cable-layer 1. Thus, by simply manipulating the quick-connect disconnect fitting 33 the conveyor roller 13 will drop from the solid outline position in FIG. 2 to the phantom outline position thereof resulting in the accurate dropping of the cable 2 in the absence of any bodily tipping of the cable-layers 1, as is done with conventional cable layers.

Each cable layer 1 also includes a further rotatable conveyor roller 15 having a substantially vertically fixed axis of rotation defined by an axle (not shown) which is mounted next to one end of the conveyor roller 13 in the vicinity of the quick-connect/disconnect fitting 33 by means of a fixed pin 31. A third conveyor roller 14 having a fixed pivot axis is mounted as shown particularly in FIG. 2, such that the three conveyor rollers 13, 14 and 15 together form an isosceles triangle. Because of the latter construction, the three conveyor rollers 13, 14 and 15 are more readily and inexpensively manufactured because they are of the same length and design and are thus interchangeable with each other. In this triple-roller configuration, the lower conveyor roller 13 in its operational position (solid line) is disposed generally horizontally, though preferably at a slight angle to the horizontal slanting toward the quick-connect/disconnect fitting 33. The conveyor roller 13 thus offers several advantages when so slightly slanted, namely, on one hand when the cable 2 is pulled through the area (unnumbered) defined by the isosceles-related conveyor rollers 13, 14 and 15, the cable 2 will not be abused, caught or hung-up because for the most part it will contact and be guided by the adjacent ends or end portions 25 of the rollers 13, 15. Furthermore, when being pulled through the area of the isosceles-related conveyor rollers 13, 14 and 15, the cable 2 will not travel sideways and/or back-and-forth along the width of the roller 13 which would cause undesired wear. Even when the cable 2 is subjected to lateral forces for instances when being laid in the arcuate ditch portions 5, 6, the cable 2 is confined on all sides by the three conveyor rollers 13, 14 and 15. Thus, the cable 2 is totally encased, so to speak, by the three conveyor rollers 13, 14 and 15 and is prevented from slipping or jumping off the cable-layer 1.

The frame 9 of the cable-layer 1 comprises three trusses 10, 11 and 12 (FIGS. 3, 5 and 6) to which the conveyor rollers 13, 14 and 15 are connected in the specific manner best illustrated in FIGS. 3 through 6 of the drawings. The lower transverse conveyor roller 13 is connected by means of the quick-connect/disconnect fitting mechanism 33 to a locking member 21 of the frame 9 on the one hand, and by the pivot pin 32 to a connector 22 of the frame 9 on the other hand. The vertical conveyor roller 15 is connected by a fixed pin 31 to the locking member 21 on the one hand and by means of a fixed pin 45 to a head piece 20 of the frame 9 on the other hand. The third conveyor roller 14 is connected by a fixed pin 29 to the connector 22 and by the fixed pin 30 to the head piece 20. If desired, the pin 30 can be a removable pin so that the conveyor roller 14 can pivot to a vertical upright position pivoting about the pin 29 which would "open" the isosceles area defined by the conveyor rollers 13, 14 and 15 to accommodate laying the cable 2 upon the conveyor roller 13 in lieu of threading the cable 2 through the three conveyor rollers 13–15 when in the closed position (FIG. 3). It is to be understood that the pins 29, 30, 31 and 45, as well as the pivot pins 32, do not act directly on the conveyor rollers 13, 14 and 15, but instead engage ends of fixed axles (not shown except for axle 74 of FIG. 11) supported the conveyor rollers 13, 14 and 15 in a freely rotatable manner. Advantageously, the conveyor rollers 13, 14 and 15 are mounted by sealed bearings, preferably ball bearings, which prevent the entry of dust and soil to preclude adverse wear of the axles and/or axle stubs and/or associated conveyor rollers 13–15. The conveyor rollers 13, 14 and 15 each include a central cylindrical segment or portion 23 and opposite axial conical outwardly flaring end portions or segments 24, 25. The conveyor rollers 13, 14 and 15 each defined by the three rollers segments 23, 24 and 25 may be constructed of a single piece of material, or alternately each roller 13, 14 and 15 can be made of three individual separate roller segments 23, 24 and 25 which freely individually rotate relative to an associated axle. Furthermore, though the conveyor rollers 13, 14 and 15 are preferably designed to the configuration illustrated, other conveyor roller designs may also be utilized depending upon the specifics of the cables to be laid and circumstances under which they are to be laid.

Figure 6:
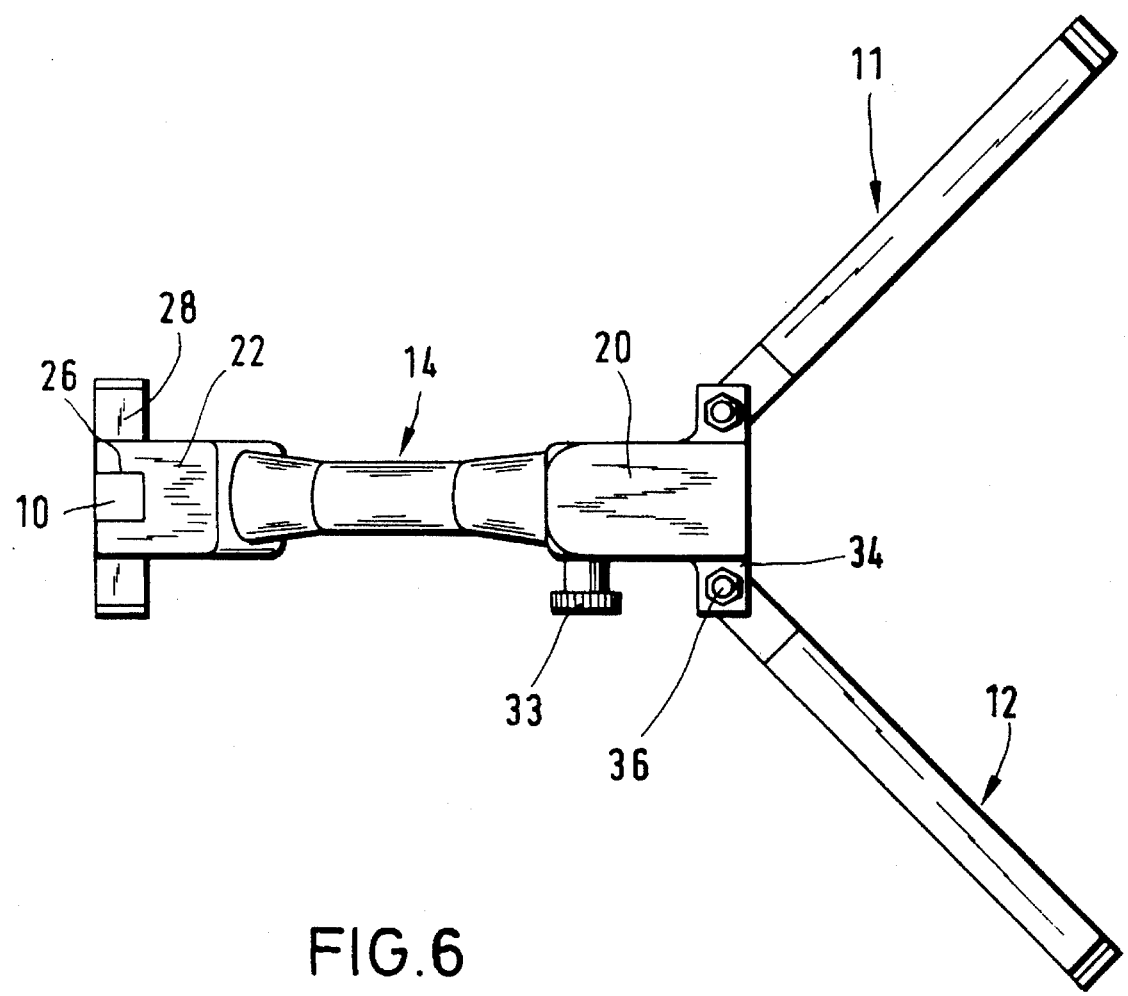
FIG. 6 is a top plan view of the cable-layer of the invention, and illustrates the manner in which legs or trusses of the frame are relatively pivoted to provide a tripod-like support for the cable-layer.
Figure 7:
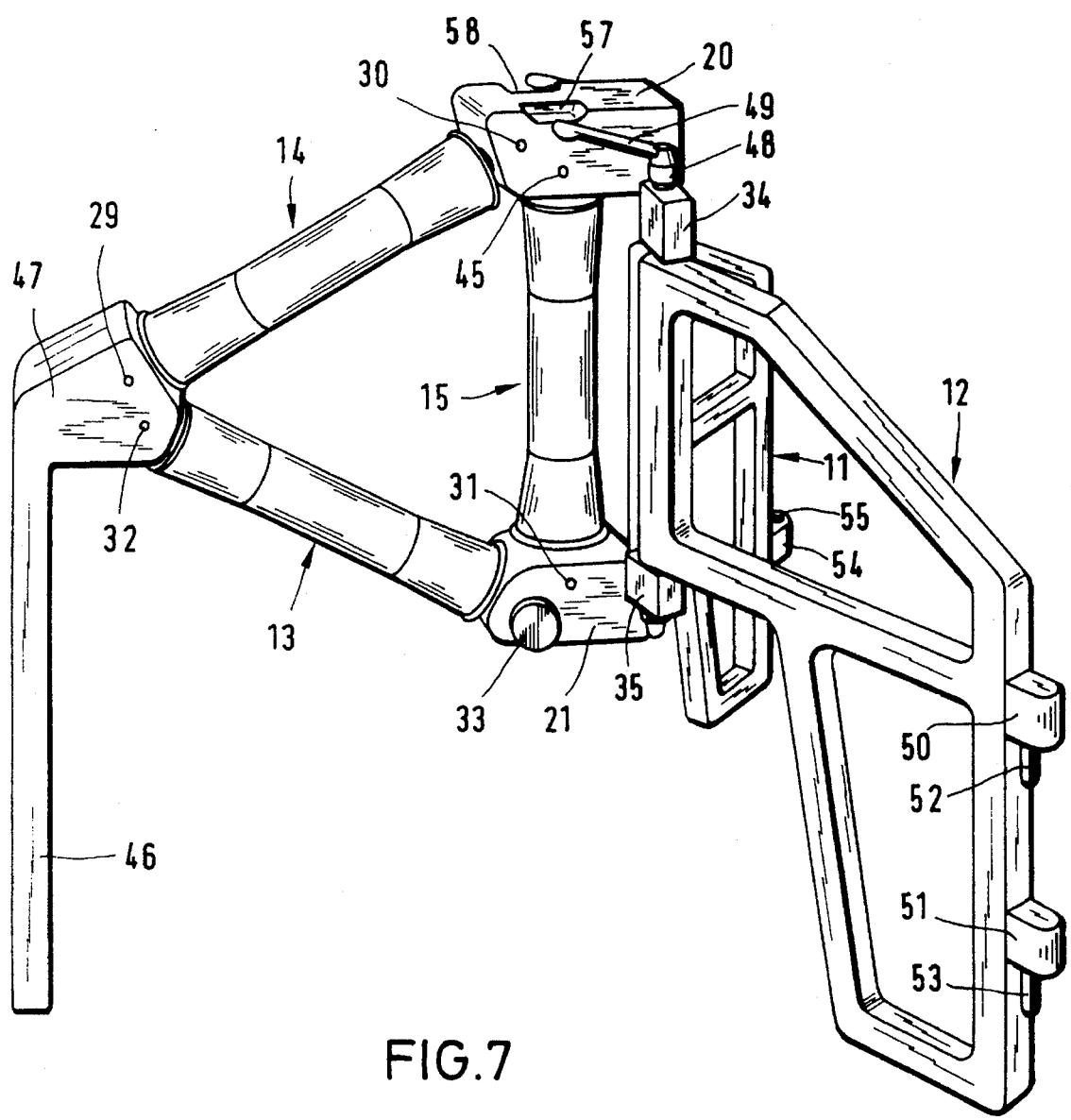
FIG. 7 is a perspective view similar to FIG. 3, and illustrates a further embodiment of the invention in which trusses of the cable-layer are provided with interconnecting elements to secure accent cable-layers to each other along the length of an associated ditch.

In the embodiment of the invention of FIGS. 3 through 6, an upper end of the truss 10 is fixed in a vertical slot 26 of the connector 22 by means of a transverse pin 27. The truss 10 is fitted within an enlarged foot 28 for providing solid support upon the ground. The two other trusses 11, 12 advantageously are designed as truss frames, and are each connected by small blocks 34, 35 to the head piece 20 and to the locking member 21. These small blocks 34, 35 are mounted laterally to each of the truss frames 11, 12 and are pivotable about a single vertical axis, pin or axle 36 or by means of a pair of pivot pins. As shown in FIG. 6, the truss frames or trusses 12, 13, when in the spread-out operational position, extend or project radially outwardly relative to the conveyor roller 1$ or a vertical plane common to the axles or axes of all three conveyor rollers 13, 14 and 13. However, the pivoted positions of the trusses 11, 12 may be universally adjusted to the geometric particulars of the cable ditch 3, for instance in such a way that the trusses 11, 12 lie in a single vertical plane. In order to move and/or to store the cable-layer 1, the two trusses 11, 12 may be pivoted inward about the pivot pins or axles 36 to bring the trusses 11, 12 in generally parallel planes to each other and to the vertical plane in which lies the axes of the three rollers 13, 14 and 18. In order to increase stability and to save material and reduce weight, the two trusses 11, 12 each include two triangular or trapezoidal subframes 37, 41. The tipper subframe 37 includes a vertical truss segment or member 38 between the two pivot blocks 34, 35, a horizontal beam or member 39 and an oblique brace or member 40. The lower subframe 41 includes a vertical truss segment or member 42, an oblique brace or member 43 and a broad foot or member 44 at a lower end thereof. The trusses 10, 11 and 12 and/or their truss members 37–40 and 42–44 may be hollow shapes to save weight and material, but they also may be cast parts. The parts can also be preferably made of corrosion-resistant metal or relatively strong synthetic plastic polymeric/co-polymeric material, and in the preferred embodiment just described, the cable-layer is of a relatively simply construction, can be easily handled, and is particularly appropriate for laying relatively light-weight cables.

A further embodiment of the invention is shown in FIGS. 7 through 13 in which a cable-layer 1' is shown constructed to meet the most severe requirements of stability and to lay very heavy and very long cables, in particularly in ditches with many curved portions, such as the curved portions 5, 6. The cable-layer 1' is provided with identical though primed reference numerals corresponding to those of the cable-layer 1 to identify identical or equivalent structure.

Figure 10:
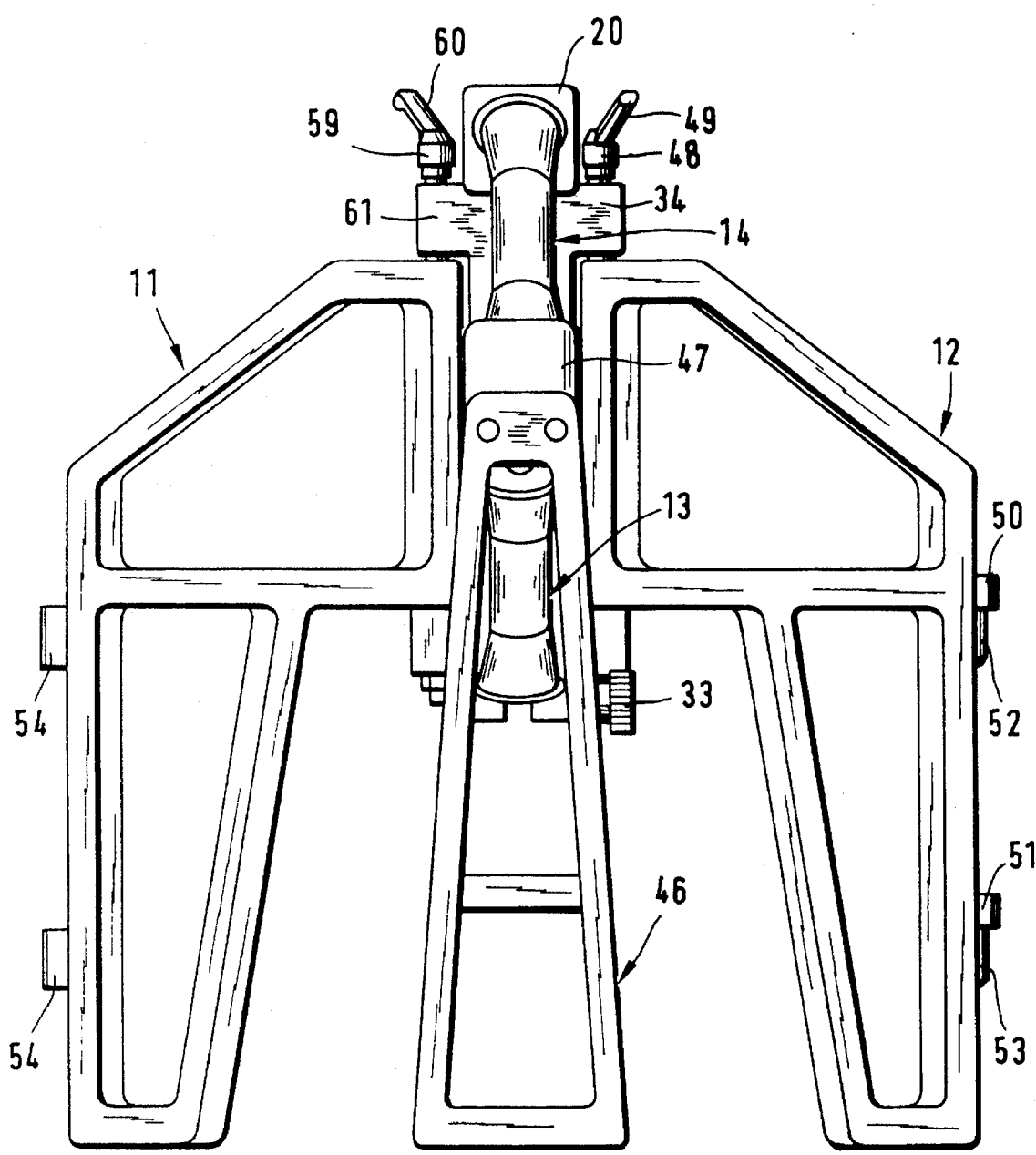
FIG. 10 is a side view taken generally along line X—X of FIG. 8, and illustrates a modification in which all three legs or trusses are formed as open truss frameworks.

The cable-layer 1' preferably includes a truss 46 in the form of a single leg (FIGS. 7 through 9) but can be in the form of a stable reinforced frame 46', as shown in FIG. 10. The trusses 46, 46' may be integral with a head member 47. In these embodiments, truss panels 11', 12' can be fixed in their operational position by clamp screws 48 and clamp levers 49, as shown in FIG. 8, or in any other outward pivoted position or in their collapsed position, as shown in FIG. 9. The trusses or truss panels 11', 12' are pivoted inward in the direction of the arrows 62, 63 into their moving and stored positions, respectively, as shown in FIG. 9. Advantageously, trough-shaped clearances 57, 58 are provided in the upper part of the head piece 20' to receive as needed, pivotable ends of the clamping levers 49. The trusses 10', 11', 12', 46 and 46', and particularly the truss panels 11', 12' are fitted at their outside with vertically spaced and superposed small blocks 50, 51 comprising downward link pins 52, 53 or alternating small blocks 54 with vertical bore holes 55. As is particularly shown in FIG. 1, it is possible through the latter structures to interconnect together several adjoining cable-layers 1', particularly where terrain makes it difficult to lay cable, and as a result even greater stability can be achieved through the latter interlocking than might be achieved apart therefrom.

FIG. 8 also shows a clamping screw 59, a clamping lever 60, and a small pivot block 61 for the truss panel 11' corresponding to the components 34', 48 and 49 of the truss 12'.

FIGS. 11 through 13 illustrate further design details present in or applicable to the cable-layers 1, 1'. The head piece 47 includes a rounded surface 56 in a pivot zone defined by the pivot pin 32' of the left end of the conveyor roller 13' with the rounded surface 56 appropriately also being present at the connector 22 (FIG. 3).

Reference is now made to FIGS. 12 and 13 which illustrate details of the quick-connect/disconnect fitting 33.

The fitting or mechanism 33 is associated with the lower transverse conveyor roller 13, 13', as heretofore noted, and includes a projecting locking claw 64 having a clearance 65, shown in phantom outline in the unfolded or dropped position in FIG. 11, which is received in a downwardly opening slot 66 formed in the locking part 21' (FIG. 12). A manually actuated locking component 68 having a front side oblique surface (unnumbered) and in the form of a pawl is located in a lateral bore hole 71. In the operational position of the conveyor roller 13' shown in FIG. 11, the locking component 68 enters the clearance or slot 65 of the locking claw 64. An appropriate and easily handled cable-layer 1' is achieved by virtue of the-fact that the locking component 68 is affixed to an inner end of a bolt 67 guided in a guide sleeve 69 screwed in place coaxially within the bore hole 71. The bolt 67 is fitted at its outer end with the pull knob 75. A compression spring 70 is located between the locking component 68 and the guide sleeve 69 and ensures that when the knob 75 is unactuated, the locking component 68 will always automatically return into the locked position (FIGS. 12 and 13). When the pull knob 75 is actuated in the direction of the arrow 72 in FIG. 12, the locking claw 64 is released from the slot 65 and the axle 74 and the conveyor roller 13' pivot or dropped tinder the influence of gravity to the vertical open position illustrated in phantom outline in FIG. 11. Thus, any cable seated upon the transfer conveyor roller 13' will also drop under the influence of gravity into the cable ditch 3. Relocking the conveyor roller 13' merely requires that it be pivoted back to the solid line position shown in FIG. 11. The locking claw 64 thereupon enters the slot 65 under the closing impact applied against the oblique surface (unnumbered) of the locking component 68 forcing the latter against the compression of the spring 70 until reaching the position shown in FIG. 12 at which time the spring 70 biases the locking component 68 to the position shown in the slot 65.

In practice the cable-laying apparatus or cable-layers 1, 1' are exposed to all types of weather conditions and extremely rough construction site operations. Thus, to accommodate the latter, the cable-layer components are advantageously made of corrosion-proof material, preferably a lightweight metal.

Although a preferred embodiment of the invention has been specifically illustrated and described herein, it is to be understood that minor variations may be made in the apparatus without departing from the spirit and scope of the invention, as defined the appended claims.

I claim:

1. Apparatus for laying cables into upwardly open cable ditches comprising a frame (9) and at least one rotatably supported conveyer roller (13) adapted to receive and support a cable thereon, said conveyer roller (13) being held by one of its ends to the frame (9) and another roller end thereof being linked by a quick-connect/disconnect mechanism (33) to the frame (9) such that upon opening the quick-connect/disconnect mechanism (33) the conveyer roller (13) drops and therewith the supported cable drops by gravity into an associated cable ditch.

2. The cable-laying apparatus as defined in claim 1 wherein said one end of said conveyor roller (13) is pivotally secured to the frame (9) by a generally horizontally disposed pivot pin (32).

3. The cable-laying apparatus as defined in claim 1 including a further conveyer roller (15) having a substantially vertical axis of rotation and being mounted contiguous one end of said first-mentioned conveyer roller (13) in the vicinity of said quick-connect/disconnect mechanism (33).

4. The cable-laying apparatus as defined in claim 3 including a third conveyor roller (14) having a fixed axis of rotation constructed and arranged such that the three conveyor rollers (13, 14, 15) jointly form an isosceles triangle open area within which a cable is adapted to reside and said first-mentioned conveyor roller (13) is a lower roller which in its cable supporting position is inclined relative to the quick-connect/disconnect mechanism (33).

5. The cable-laying apparatus as defined in claim 4 wherein said lower conveyor roller (13) is linked on one hand by means of the quick-connect/disconnect mechanism (33) to a locking member (21) and on the other hand by means of pivot pin (32) to a connector (22), said vertical conveyor roller (15) is linked by means of fixed pins (31,45) on the one hand to the locking member (21) and on the other hand to a head piece (20), and the third conveyor roller (14) is linked by fixed pins (29, 30) to the connector (22) and the head piece (20).

6. The cable-laying apparatus as defined in claim 5 wherein each conveyor roller (13, 14, 15) comprises a central cylindrical segment (23) and two axially oppositely outward-flaring conical segments (24, 25).

7. The cable-laying apparatus as defined in claim 4 wherein the conveyor rollers (13, 14, 15) are each supported on an axle.

8. The cable-laying apparatus as defined in claim 4 wherein said frame (9) comprises three trusses (10, 11, 19, 46, 46').

9. The cable-laying apparatus as defined in claim 8 wherein one truss (10) is linked at an upper end thereof to one of said connectors (22) and said head piece (47) and the remaining trusses (11, 12) are linked by small blocks (34, 35) to said head piece (20) and said locking member (21).

10. The cable-laying apparatus as defined in claim 9 wherein said small blocks (34, 35) include one of vertical pivot axles and pivot pins.

11. The cable-laying apparatus as defined in claim 10 wherein said remaining trusses (11, 12) are defined by truss frames which can be pivoted away from each other to a first spread-apart operational position and inward to a second collapsed position in which said remaining trusses (11, 12) are approximately parallel to each other and to a vertical plane common to axes of said three rollers.

12. The cable-laying apparatus as defined in claim 11 wherein said truss frames (11, 12) each include one of two triangular frames and trapezoidal frames (37, 41).

13. The cable-laying apparatus as defined in claim 12 wherein said truss frames (11, 12) can be clamped by clamping screw means (48) and clamping lever means (49) for securement in any of said first and second positions.

14. The cable-laying apparatus as defined in claim 13 wherein said trusses (10, 11, 12; 46) carry one of blocks (50, 51) with connecting pins (52, 53) and the blocks (54) with bore holes (55).

15. The cable-laying apparatus as defined in claim 1 wherein said quickconnect/disconnect mechanism (33) for said first-mentioned conveyor roller (13) comprises a locking claw (64) provided with a clearance (65) and being linked to an axle (74) of said first-mentioned conveyor roller (13), a downwardly opening slot (66) corresponding in width to the width of a locking claw (64) of a locking part (21), and manually actuated locking means (68) operable through a lateral borehole (71) for entering said clearance (65) of said locking claw (64).

16. The cable-laying apparatus as defined in claim 15 wherein said locking means (68) is affixed to an inner end of a bolt (67) guided in a guide sleeve (69) which is coaxial to said lateral borehole (71) and is fitted at an outer end with a pull knob (75), and compression spring means (70) between a locking component of said locking means (68) and said guide sleeve (69) for normally biasing said locking component into said clearance (65).

\* \* \* \* \*